US006775163B2

(12) United States Patent
McDonald et al.

(10) Patent No.: US 6,775,163 B2
(45) Date of Patent: Aug. 10, 2004

(54) DUAL INPUT AC/DC TO PROGRAMMABLE DC OUTPUT CONVERTER

(75) Inventors: Gilbert McDonald, Queen Creek, AZ (US); Charles Lord, Scottsdale, AZ (US); Steve Smith, Phoenix, AZ (US); Garry DuBose, Scottsdale, AZ (US)

(73) Assignee: Mobility Electronics Inc., Scottsdale, AZ (US)

( * ) Notice: Subject to any disclaimer, the term of this patent is extended or adjusted under 35 U.S.C. 154(b) by 0 days.

(21) Appl. No.: 10/661,216

(22) Filed: Sep. 12, 2003

(65) Prior Publication Data

US 2004/0037102 A1 Feb. 26, 2004

Related U.S. Application Data

(63) Continuation of application No. 10/005,961, filed on Dec. 3, 2001, now Pat. No. 6,643,158.
(60) Provisional application No. 60/335,785, filed on Oct. 31, 2001.

(51) Int. Cl.[7] ............................................. H02M 1/10
(52) U.S. Cl. ...................................................... 363/142
(58) Field of Search ........................... 363/37, 64, 65, 363/66, 72, 73, 75, 142

(56) References Cited

U.S. PATENT DOCUMENTS

| 1,741,265 A | 12/1929 | Wappler |
| 2,427,111 A | 9/1947 | Tolmie |
| 2,792,559 A | 5/1957 | Maberry |
| 3,201,617 A | 8/1965 | Pacoroni et al. |
| 3,256,466 A | 6/1966 | Trolio et al. |
| 3,281,747 A | 10/1966 | Winsand |
| 3,275,855 A | 9/1968 | Wright |
| 3,452,215 A | 6/1969 | Alessio |
| 3,484,864 A | 12/1969 | Bernstein et al. |
| 3,581,480 A | 6/1971 | O'Conner et al. |
| 3,784,956 A | 1/1974 | Gassman |

(List continued on next page.)

OTHER PUBLICATIONS

Press Release of Empire Engineering, Electronic Design and Management, Jul. 5, 1995—San Luis Obispo, CA USA, pp1–2.
Description of the "Smart Adapter System" NESCO Battery Systems, 1995; pp. 1–2.
Macworld, "On the Road", vol. 12, No. 7 Jul. 1995, pp 141–142, 5/9/1 (item 1 from file: 15) DIALOG(R) File 15: AB1/INFORM(R).
Empire Engineering San Luis Obispo, CA; SmartCord Assembly and Schematic Drawing: Feb. 9, 1996 pp 1–3.

(List continued on next page.)

Primary Examiner—Adolf Berhane
(74) Attorney, Agent, or Firm—Jackson Walker LLP; Robert C. Klinger

(57) ABSTRACT

A power converter capable of receiving either an AC input voltage or a DC input voltage and generating a programmable DC output voltage. The converter comprises a first circuit that converts an AC input voltage to a predetermined DC first output voltage, and a second circuit that converts a DC input voltage to a predetermined second DC output voltage. The converter also comprise a third circuit which is adapted to receive the first and second DC voltages from first and second circuits to generate a selectable output DC voltage. In selected embodiments, the first and second DC output voltages provided by the first and second circuits, respectively, are generally the same value and are coupled to a common node that feeds the input terminal of the third circuit. Moreover, the third circuit is adapted to provide a selectable output DC voltage which may be set higher or lower than its DC input voltage. The third circuit may also be adapted to couple a set of removable programming keys that provide for a different associated DC output voltage. The programming key comprises a resistor, which may provide for a variety of functions, such as current-limiting, over-voltage protection, output voltage programming, and wrong-tip circuit protection.

20 Claims, 6 Drawing Sheets

U.S. PATENT DOCUMENTS

| | | |
|---|---|---|
| 3,870,946 A | 3/1975 | Sandorf |
| 3,996,546 A | 12/1976 | Hugly |
| 4,089,041 A | 5/1978 | Lockard |
| 4,164,665 A | 8/1979 | Berger |
| 4,239,319 A | 12/1980 | Gladd et al. |
| 4,258,969 A | 3/1981 | Stallard |
| 4,622,627 A | 11/1986 | Rodriguez et al. |
| 4,713,642 A | 12/1987 | Wolfe et al. |
| 4,885,674 A | 12/1989 | Varga et al. |
| 4,890,214 A | 12/1989 | Yamamoto |
| 5,019,954 A | 5/1991 | Bourgeault et al. |
| 5,040,990 A | 8/1991 | Suman et al. |
| 5,044,964 A | 9/1991 | Minerd et al. |
| 5,092,788 A | 3/1992 | Pristupa, Jr. et al. |
| 5,181,859 A | 1/1993 | Foreman et al. |
| 5,290,191 A | 3/1994 | Foreman et al. |
| 5,347,211 A | 9/1994 | Jakubowski |
| 5,369,352 A | 11/1994 | Toepfer et al. |
| 5,412,248 A | 5/1995 | Murari et al. |
| 5,428,288 A | 6/1995 | Foreman et al. |
| 5,455,734 A | 10/1995 | Foreman et al. |
| 5,479,331 A | 12/1995 | Lenni |
| 5,636,110 A | 6/1997 | Lanni |
| D391,227 S | 2/1998 | Dickey |
| 5,770,895 A | 6/1998 | Kumasaka |
| 5,838,554 A | 11/1998 | Lanni |
| 5,886,422 A | 3/1999 | Mills |
| 5,949,213 A | 9/1999 | Lanni |
| 6,064,177 A | 5/2000 | Dixon |
| 6,091,611 A | 7/2000 | Lanni |
| 6,172,884 B1 | 1/2001 | Lanni |
| 6,643,158 B2 * | 11/2003 | McDonald et al. ......... 363/142 |

OTHER PUBLICATIONS

Empire Engineering, "Universal DC Adapter for Portable Computer Power" Electronic Design and Management; Jan. 1995.

Press Release "New PowerXtenderoe Adapter Lets Portable Computer Users Plug into Computing Power on Airplanes and in Cars" Irvine, CA Apr. 30, 1997, 2 pages.

BenchMarq; Fast–Charge IC, bq2002C, Sep. 1997; pp. 1–9 thru 1–16.

Electronic Products, "Smart External Adapter Meets Many Portable Power Needs" May 1995, 1 page.

Minwa Product Information, MW182, 1993, 1 page.

Smart Adapter Power Converter Schematic, Empire Engineering, Feb. 27, 1995.

Smart Adapter Power Converter Schematic, Empire Engineering, Apr. 27, 1997.

Specification Change Notice, General Dynamics, Oct. 26, 1979.

* cited by examiner

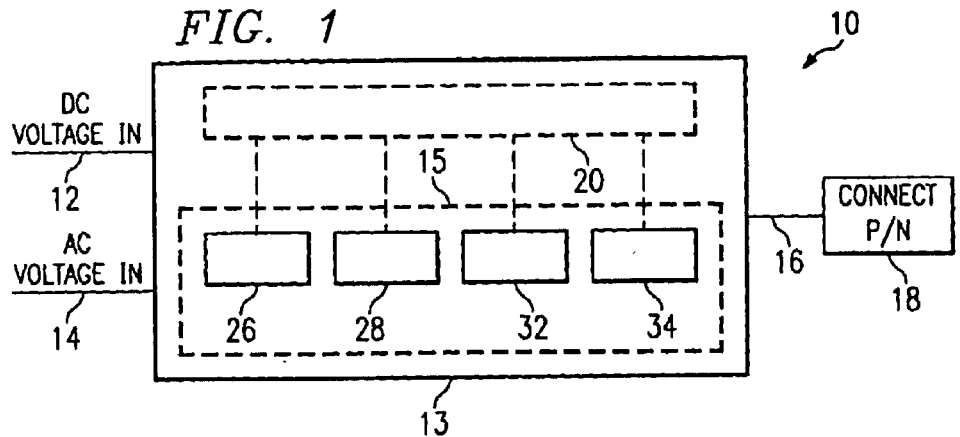
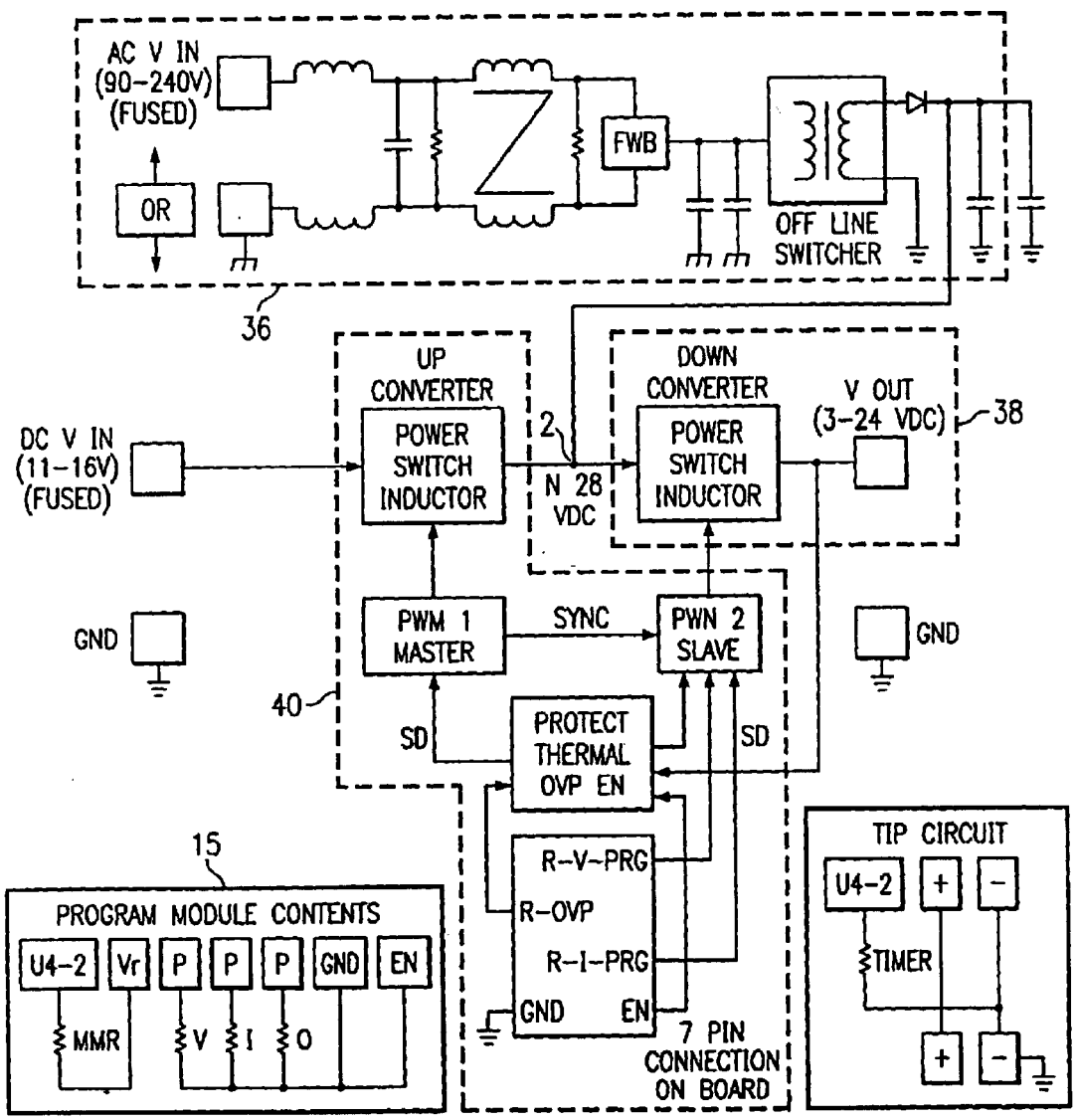

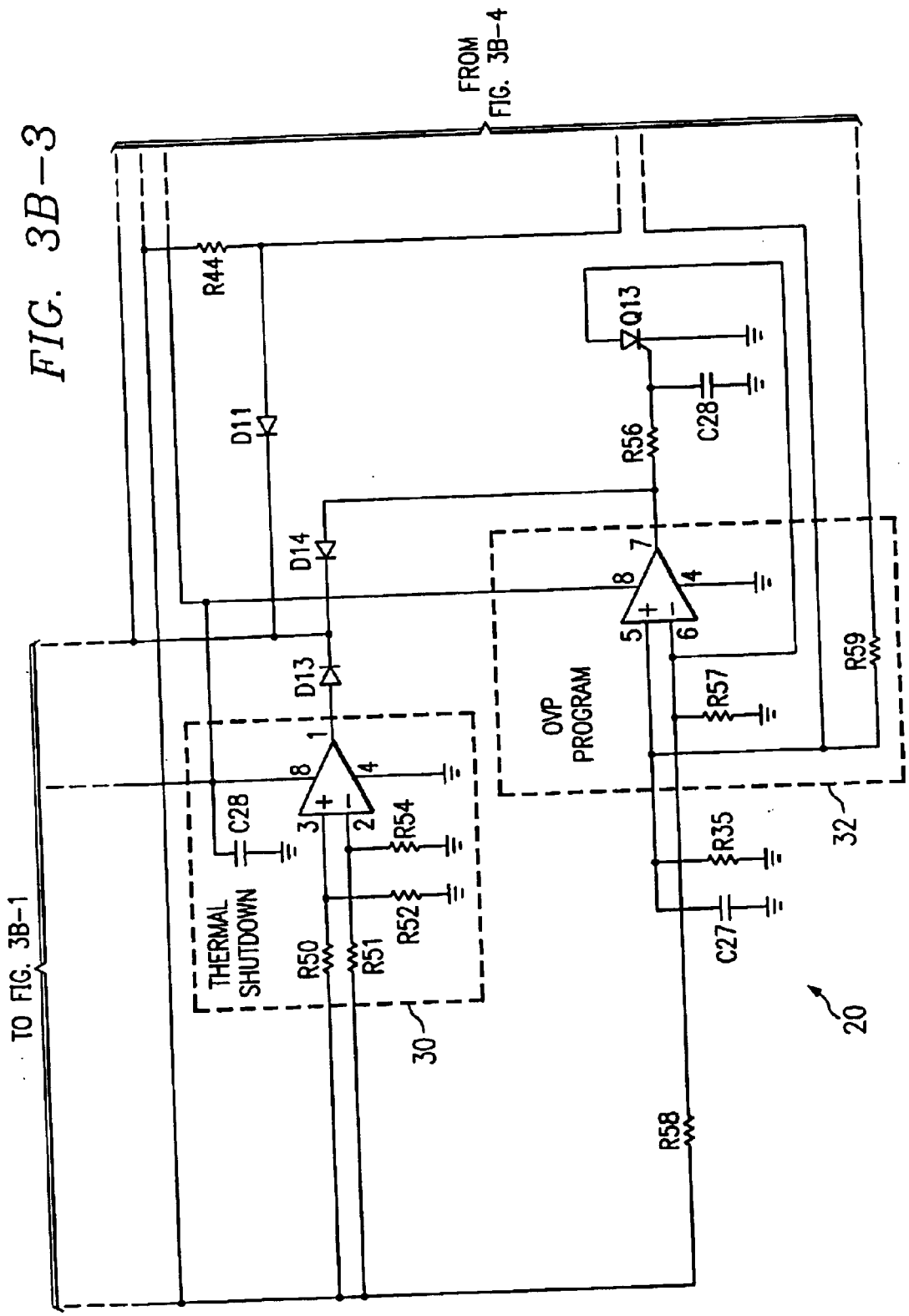

DUAL INPUT AC/DC TO PROGRAMMABLE DC OUTPUT CONVERTER

This invention is continuation and claims priority under 35 U.S.C. § 119(e)(1) from the following co-pending U.S. patent application, Ser. No. 10/005,961 by Charles Lord, et al., entitled "Dual Input ACID to Programmable DC Output Converter" filed Dec. 3, 2001 now U.S. Pat. No. 6,643,158 which is a conversion from U.S. Provisional Patent Application, Serial number 60/335,785 by Charles Lord, et al., entitled "Dual Input AC/DC to Programmable DC Output Converter" filed on Oct. 31, 2001. The aforementioned patent application is hereby incorporated by reference.

TECHNICAL FIELD

The present invention generally relates to the field of power converters, and more particularly to a power converter adapted to provide a selectively programmable DC voltage output based on either an AC or DC voltage input.

BACKGROUND OF THE INVENTION

As the use of mobile electronic products, such as PC notebooks, PDAs, Cellular Telephones and the like, continues to increase, the need for low costs, compact power supplies to power and recharge these products, also, continues to increase. Today, in order to meet their customer's mobile power supply needs, most manufacturers include mobile power adapters along with their mobile products.

Today's power adapters are typically AC-to-DC, or DC-to-DC power converters which are configured to either step-up or step-down the DC voltage input delivered to the mobile device. With AC-to-DC adapters, for example, users can power most mobile devices by simply plugging the adapter into a simple AC wall outlet found in most homes or offices. Similarly, when only DC input power is available, such as in an automobile or airplane, users can still power their mobile devices by simply using a DC-to-DC converter adapter. Often, these adapters are specifically designed and tailored to provide a regulated DC output voltage, which range from between 5VDC to 30VDC depending on the kind of mobile device being powered.

Although these power adapters conveniently provide direct power and recharging capabilities, users are often required to carry separate adapters to provide power to each individual mobile device. This often means that users have to carry multiple adapters: one for an AC input power source, and another for a DC input power source. Thus, by carrying more than one device at a time, mobile device users are often forced to carry extra bulk in the form of two distinct power supplies to power two distinct mobile devices.

Accordingly, there exists a need for a power conversion device that resolves the system management problems associated with carrying all of the different power supply components necessary to power a wide variety of mobile or portable devices. Moreover, such a device would advantageously encompass serving the power supply needs of all these different mobile devices, while supplying a steady, regulated DC power output in response to either a changing AC or DC input voltage.

SUMMARY OF THE INVENTION

The present invention achieves technical advantages as a power converter capable of supplying a DC output from either an AC or DC input covering a wide range of voltage and current combinations, through external programmability, and suitable for a variety of mobile or stationary product offerings. Such a invention resolves the system management problems associated with carrying all of the different interface components necessary to power a wide variety of mobile or portable products.

In one embodiment, the invention is generally a power converter capable of receiving either an AC input voltage or DC input voltage and generating a programmable DC output voltage. The converter comprises a first circuit that converts an AC input voltage to a predetermined DC first output voltage, and a second circuit that converts a DC input voltage to a predetermined second DC output voltage. The converter also comprise a third circuit which is adapted to receive the first and second DC voltages from first and second circuits so as to generate a selectable output DC voltage.

In selected embodiments, the first and second DC output voltages provided by the first and second circuits, respectively, are generally the same value and are coupled to a common node that feeds the input terminal of the third circuit. Moreover, the third circuit is adapted to provide a selectable output DC voltage which may be set higher or lower than its DC input voltage. The third circuit may also be adapted to couple a set of removable programming keys that provide for a different associated DC output voltage. The programming key comprises a resistor, which may provide for a variety of functions, such as current-limiting, over-voltage protection, output voltage programming, and wrong-tip circuit protection.

Accordingly, the invention advantageously provides an inventive embodiment that allows mobile product users to supply power or recharging capabilities to a variety of mobile products with a single, low cost, compact device.

BRIEF DESCRIPTION OF THE DRAWINGS

Advantages of the invention and the specific embodiments will be understood by those of ordinary skill in the art by reference to the following detailed description of preferred embodiments taken in conjunction with the drawings, in which:

FIG. 1 shows a block diagram of a dual input AC/DC power converter in accordance with the present invention;

FIG. 2 is a schematic overview of the power converter circuit as depicted in FIG. 1 in accordance with the present invention; and FIG. 3A, FIG. 3B-1, FIG. 3B-2, FIG. 3B-3 and FIG. 3B-4 show a schematic diagram of the power converter having an AC converter circuit, an up-converter circuit and a down-converter circuit in accordance with an exemplary embodiment of the present invention.

DETAILED DESCRIPTION OF THE PREFERRED EMBODIMENT

The numerous innovative teachings of the present applications will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 3A:
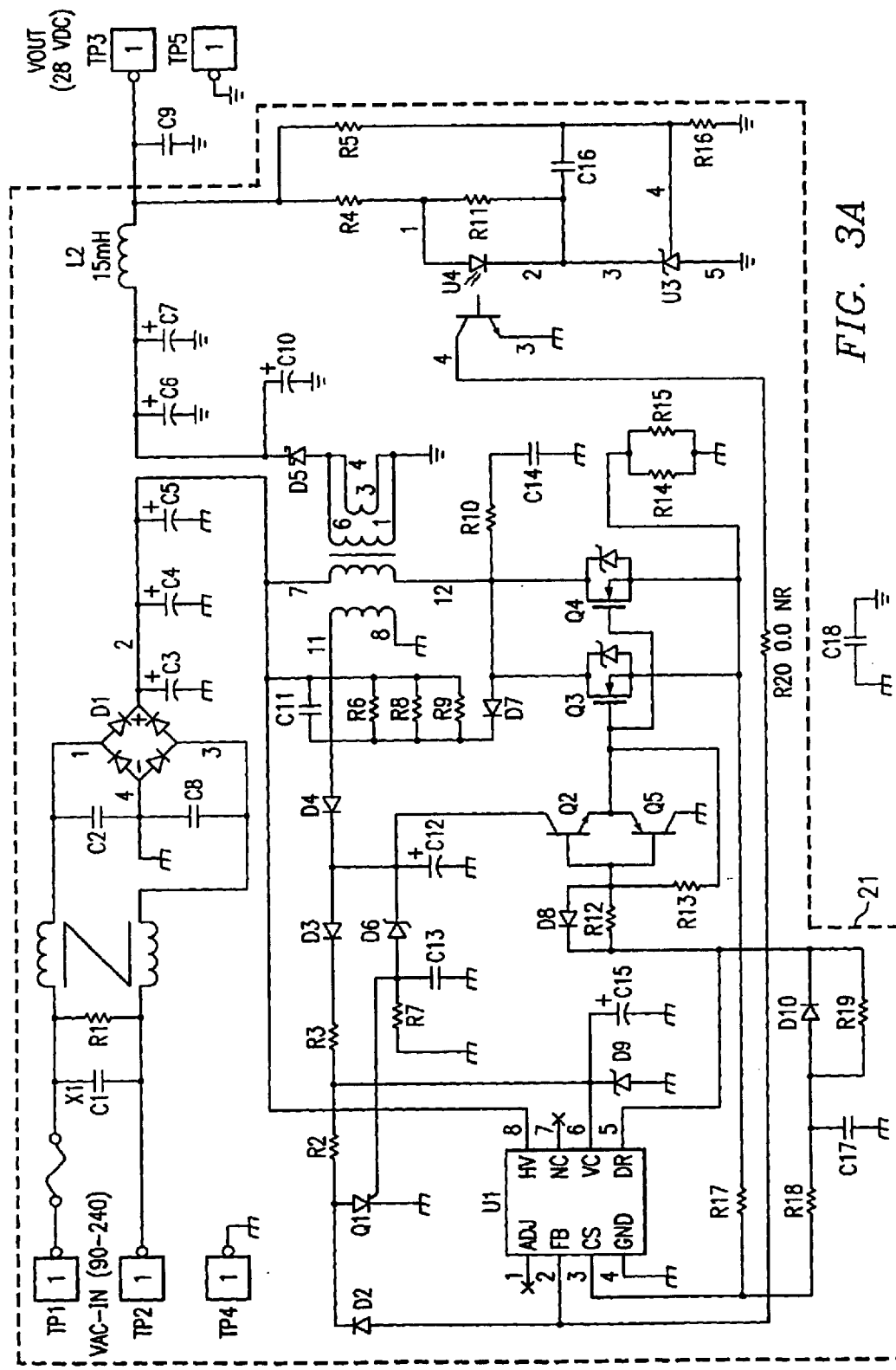
Figures 1, 3B:
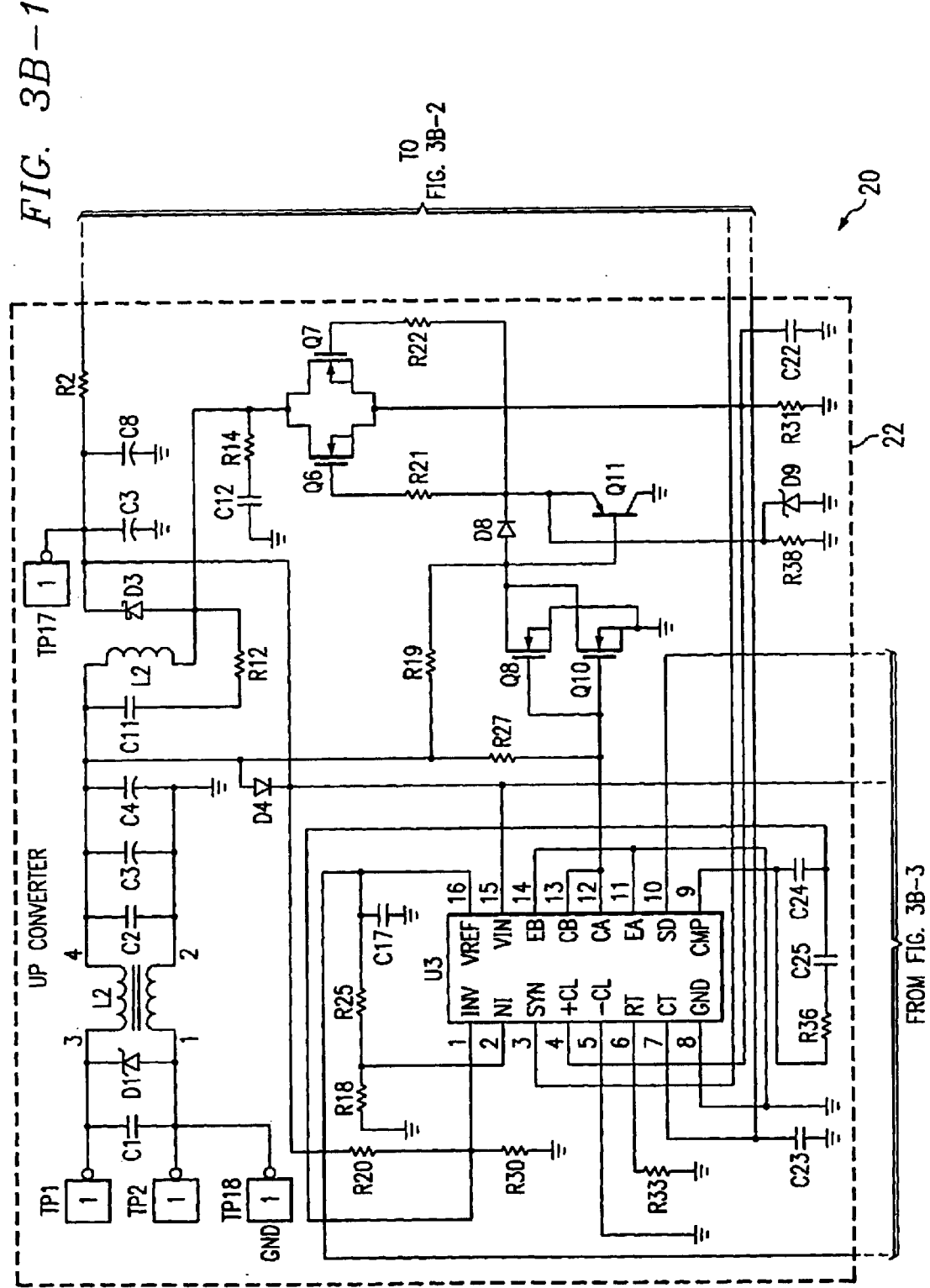

FIG. 1 shows a block diagram of a dual input AC/DC power converter 10 in accordance with the present invention. The power converter 10 comprises a power converter circuit 20 having input terminals 12 and 14 which are adapted to receive an AC input voltage and a DC input voltage, respectively. The power converter circuit 20 also includes an output terminal 16 adapted to provide an programmable DC output voltage which is received at connector pin 18. The power converter 20 is seen housed in housing 13 which has a predetermined slot for receiving a set of function key 15, comprising a set of resistors, adapted to interface circuits 26, 28, 32, and 34, as will be discussed shortly in regards to FIG. 3.

Figures 2, 3B:
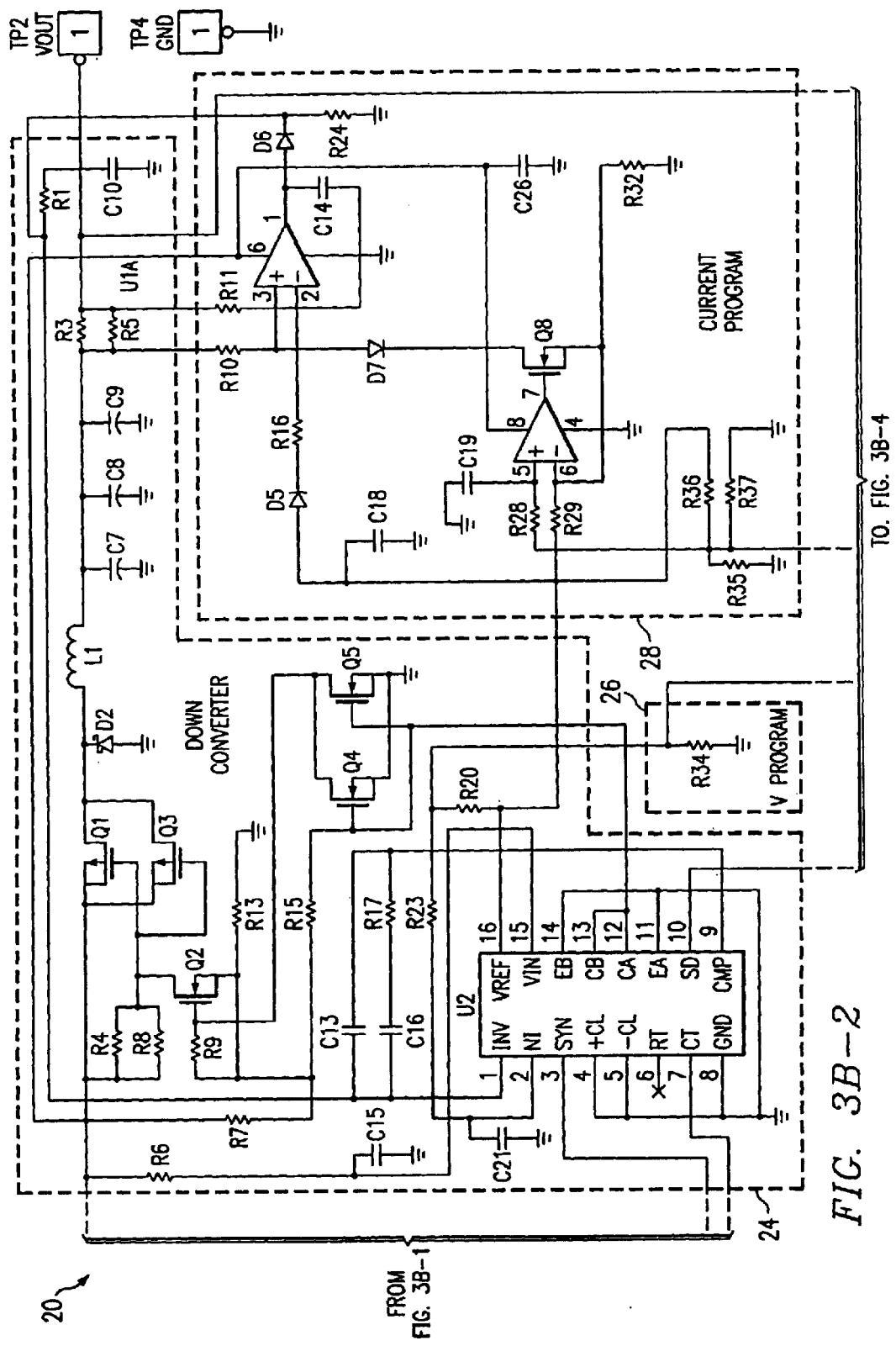
Figures 3, 3B, 4:
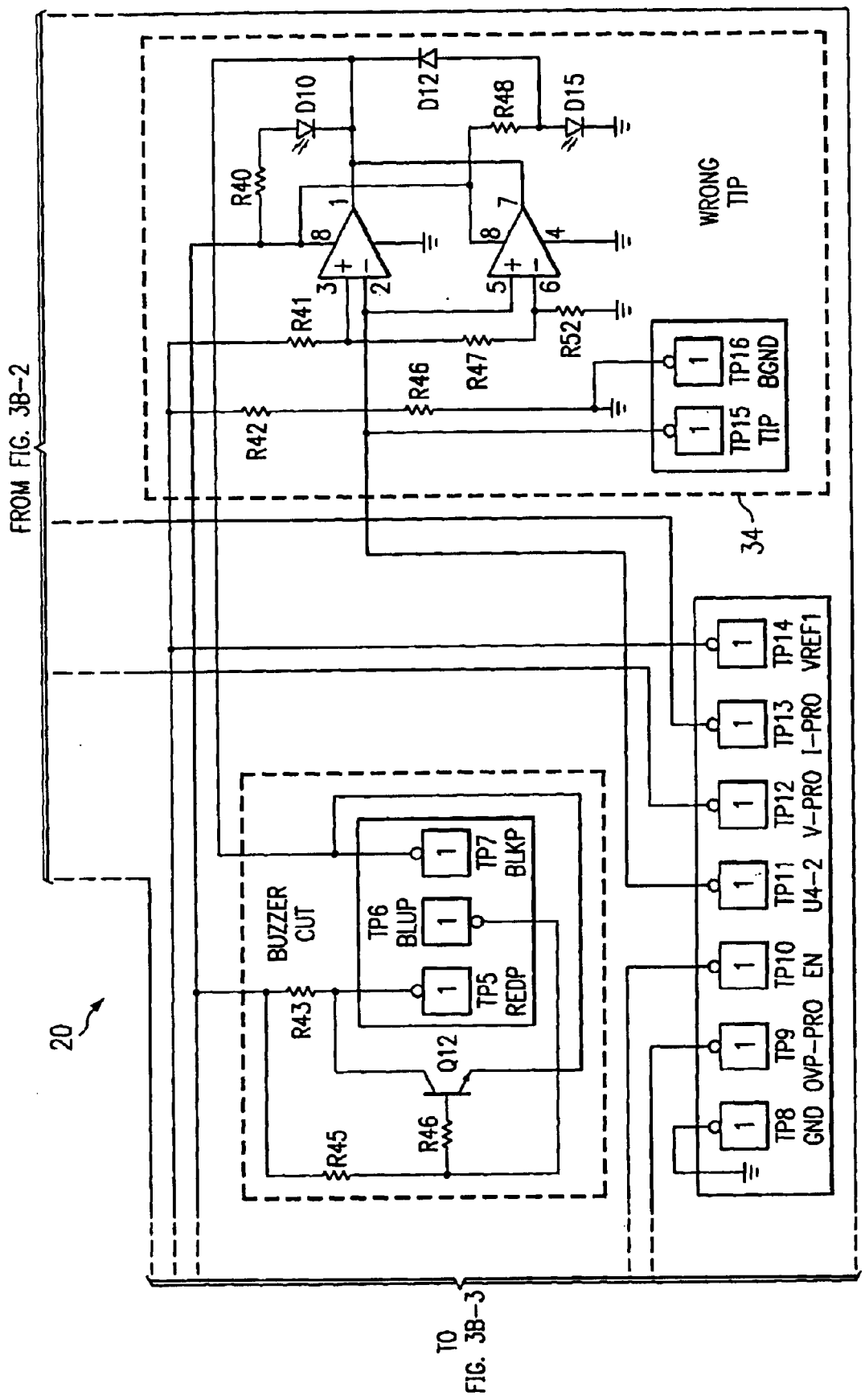

Referring now to FIG. 2, there is illustrated a schematic overview of the power converter 20 circuit as depicted in FIG. 1 in accordance with the present invention. The converter circuit 20 is seen having an AC input portion 36 and a DC input portion 40 providing outputs which feed into a common node 2. The converter circuit 20 is also seen to have a programmable DC output portion 38 coupled to node 2 and adapted to provide a regulated DC voltage output.

Referring now to FIGS. 3A, 3B-1, 3B-2, 3B-3 and 3B-4, there is shown a schematic diagram of an dual input AC/DC power converter 10 having an AC input circuit 21, an up-converter circuit 22 and a down-converter circuit 24 in accordance with an exemplary embodiment of the present invention. The AC input circuit is shown at 21 and is configured in as a fly-back converter. The AC voltage input is fused by Fl and has EMI suppression with C1, L1, C2, C8. The AC voltage is then full wave rectified through D1 and C3–C5. This higher DC voltage (367v max) is fed to the main controller chip U1. This chip is designed for wide mains applications and can be tied directly to the DC rail. The frequency of operation is preset by the manufacturer depending on which version is called out; for example the frequency is typically set at 100 khz. The clock on the chip together with the error amplifier, then modifies the output drive duty cycle to power field-effect transistors (FETs) Q2 and Q5. These FETs then switch the main power transformer T1 to deliver pulse width energy through output rectifier D5 and also to the output filter capacitors C6, C7 and C10. I2 and C9 provide additional filtering to reduce ripple and noise at the output.

An auxiliary winding is used on the main transformer TI to provide for a lower VC to the chip than the mains and a reasonable voltage for Q3 and Q4 to operate from. These FETs provide for faster turn on and turn off times for the gates of the power FETs Q3 and Q4. Q2 is the "on component" switch for the power FETs and Q5 is the "off component" switch that drives the FETs to a hard ground necessary for the parasitic capacitance that resides at these gates. The diodes D3, D4 and C12 completes the bootstrap auxiliary supply. This auxiliary supply also provides a method where if the power converter circuit 20 had a certain failure mode, the power converter 10 would shut down through SCR Q1 and the ac input would have to be recycled to allow the power converter 10 to come up again. If the fault condition still existed, then the power converter 10 would not turn on. This is often used in off-line switchers.

Input and output isolation is provided by TI transformer and its secondary. Further isolation is given through the opto-coupler U4. The converter's circuit 20 feedback path to provide for a regulated output goes through this device and is referenced against a shunt regulator U3 on the secondary side. It is the sole purpose of AC input circuit 21 is to provide isolation from the ac line and also to produce a regulated DC output voltage of approximately 28V, which is subsequently feed to a common node 2, as will also be discussed shortly.

In operation, the AC circuit 21 is by no means a programmable supply nor does it contain any "smart" circuitry other than to provide a fixed regulated DC output. Common node 2 is the node at which the AC circuit's output (TP3) comes into the output of the up-converter circuit 22, which is also the same as the input to the down-converter circuit 24. Moreover, this is the main node that allows the down-converter to operate off of either input to the power converter circuit 20 as a whole. It should be understood that depending on which country the invention is used in, there will be different AC plugs available that will allow the supply to interface with their outlets.

In one preferred embodiment, the up-converter circuit 22 is configured in a standard "boost" topology and is adapted to receive a DC input voltage ranging between 11–16 vdc, though a particular voltage range is not to be inferred. This voltage range, however, is common in most air and automobile environments. The DC voltage itself is fed into an EMI filter consisting of C1, I2, C2–C4 and then into the controller U3 and the up inductor 13. The frequency of operation was chosen to be around 80 khz for U3. This is externally set by R33 and C23. Output and duty cycle is determined by U3 and drives Q8 and Q10 eventually into power FETs Q6 and Q7. Feedback and voltage output set point is determined by R20 and R30 into pin 1 of U3 and is referenced against the 5.1 v on board reference divided down by R18 and R25 into the non-inverting input error amplifier of U3. This completes most of the control loop except for some loop stability components R39, C24 and C25. L3 is then charged by FETs Q6 and Q7 in the on mode and 13 is then discharged through D3 into filter caps C5–6. Moreover, in a standard boost operation, R38 offers a bleeder resistance to ground in the event Q6–7 are unable to receive a signal from its drivers Q8–9, so as to prevent unwanted turn on of these FETs. D9 also prevents an over-voltage spike entering the gates of Q6–7 and damaging the gate to source junction. C11 and C12 and R12 and R14 are adapted for wave shaping and function as snubbers due to leakage inductance of 13. Q11 forms a hard off to ground due to the parasitic capacitance of the gates on Q6–7.

It should be understood that the up-converter circuit 22, as shown, does not have any additional circuitry other than to convert from an 11–16V input to approximately 28VDC and is not programmable. U3 has a feature that allows another controller to be frequency slaved to it as is done in this supply with the down converter side. Advantageously, this allows for easier EMI suppression when one operating frequency is filtered versus two. In addition, the output of the up-converter circuit 22 is preferably the same node 2 as the output of the AC/DC supply TP17.

As for the down-converter circuit 24, it is configured to receive, from any source, an input voltage of around 28VDC. More importantly, the down-converter circuit 24 need not recognize an AC input voltage or DC input voltage. As such, no voltage switch-over is required, which advantageously makes this function transparent to the down-converter 24. Nevertheless, when an ac input voltage is provided to the AC input circuit 21, the up-converter circuit 22 is not switching and is only running its clock for U2 its slave.

Still referring FIGS. 3A, 3B-1, 3B-2, 3B-3 and 3B-4, there is shown a down-converter circuit 24 configured in a standard "buck" topology. Here, the down-converter circuit 24 receives a DC input voltage at node 2, which is the same node at which the AC input circuit 21 and the up-converter circuit 22 provide their DC voltage outputs. U2 is the same part as the controller on the up side. The operating frequency is determined by and is slaved to U3 of the up side. This supply does not require input EMI filtering for this is taken care of by up stream filtering done on both sides of the dual input regulators as discussed earlier. Output drive signals from U2 develops through pre-drivers Q4–5 and Q2 to the P-channel power FETs Q1,3. The FETs on time and duty cycle charge power inductor I1 and then the catch diode D2 supplies the rest of the cycle during Q1,3 off time for normal "buck" operation. The 28V input was chosen to be slightly above the highest output required by the load application of 24V to keep the down-converter circuit 24 in operation $V_{IN} > V_{OUT}$.

In a selected embodiment, the power converter 10 has a small plug-in module, comprising key 15, that contain four resistors each internally housed and are plugged into the power converter 10 so as to change the power converter's output voltage to conform to a particular load requirement. Load requirements often change depending on the application, such as in laptop computer where different laptops have different voltage operating requirements. With the present invention, these resistors, individually, will program the output voltage, the current limit, the over-voltage protection, and the tip-matching program, as will be discussed shortly.

Still referring to FIGS. 3A, 3B-1, 3B-2, 3B-3 and 3B-4, there is shown at 26 an output voltage programming circuit. Voltage programming is established by R34 which comprises a resistor module. This resistor sets a voltage divider into the non-inverting input pin 2 of U2 which is referenced to the output voltage being fed back through r1 into the inverting input of U2 at pin 1, so as to achieve the desired duty cycle. Components C13, C16 and R17 are included to provide compensation for the error amplifier within U2 to keep the control loop stable over all conditions of line and load values.

Still referring to FIGS. 3A, 3B-1, 3B-2, 3B-3 and 3B-4, there is shown at 28 a current limiting circuit. A current limiting function may be programmed by setting removable module R37 to ground. Further, U1b is seen to have its input referenced around a divider coming from the onboard reference of U2 and divided down through R29 and R32. Q9 and D7 allows for a constant current setup to operate regardless of output voltage level. R3 and R5 are the current sense resistors to provide the differential voltage required across the inputs of U1a pins 2 and 3 required to begin the forward bias of D6 which will begin to limit the power to the output via the inverting input of U2. U1 has its VCC tied to the input side of the power converter circuit 20 such that any sensing can be done close to the output voltage and will not require a rail-to-rail costly op-amp.

Still referring to FIGS. 3A, 3B-1, 3B-2, 3B-3 and 3B-4, an overprotection circuit is seen at 32. Over-voltage programming is set by R55 to ground and is a module resistor. U5b has a reference set up from the onboard reference of U3 to pin 6 via R58 and R57 divider. Output voltage is sensed and divided down through R59 and R55 provides the other half. In the event of the output attempting to go beyond a prescribed point due to some internal component failure, pin 7 of U5b will switch high and shutdown both U3 and U2 via shutdown pin 10 from D14. Q13 will then trigger holding U5b in a constant high state until input power is cycled.

Still referring to FIGS. 3A, 3B-1, 3B-2, 3B-3 and 3B-4, a voltage-correction circuit is seen at 34. Module resistor R42, the fourth resistor, is valued at the same value and tolerance as the tip module resistor R46. These resistors are compared through U4a and b. If these values match, then we allow the green led D15 to enable and the user is fairly confident he has the correct voltage programmed for the particular device he is powering with the correct tip. In the event that the tip resistor R46 does not match the module resistor R42, we will enable the red led D10 and also produce an low level audible ping from a piezo telling the user he has incorrectly installed the wrong tip or incorrectly programmed the output in which case another attempt should be made.

As further shown in FIGS. 3A, 3B-1, 3B-2, 3B-3 and 3B-4, a thermal shutdown circuit, depicted at 30, will prevent the supply from overheating based on a preset temperature value measured on the case of the supply. U5a has a fixed 2.5v reference set on pin 2 of the comparator via R51 and R54 off of the reference voltage of U3 controller. R53 is a positive temperature coefficient thermistor that will be placed at a key location on the supply to prevent the supply from over heating (ie. Covered up in a blanket). As temperature increases, the resistance value of R53 also increases raising pin 3 to a point above pin 2 where the comparator switches to a high state and through diode D13 switches off U3 and U2 via their shutdown pin 10 which is active high. As the supply cools and U5a switches low, the supply will turn on and operate until another over temperature condition occurs.

Though the invention has been described with respect to specific preferred embodiments, many variations and modifications will become apparent to those skilled in the art upon reading the present application. It is therefore the intention that the appended claims be interpreted as broadly as possible in view of the prior art to include all such variations and modifications.

What is claimed is:

1. A power conversion device capable of receiving either an AC input voltage or a DC input voltage and generating a programmable DC output voltage, said device comprising:
   a first circuit converting an AC input voltage to a DC output voltage;
   a second circuit converting a DC input voltage to a fixed DC output voltage even when said DC input voltage varies, wherein said second circuit includes a DC-to-DC up converter; and
   a third circuit receiving said DC output voltages and said fixed DC output voltage from said first and second circuits, respectively, and generating a selectable output DC voltage.

2. The device as recited in claim 1 wherein said first circuit includes a switching device, wherein said switching device is an AC line switcher.

3. The device as recited in claim 1 wherein the first circuit DC output voltage is a fixed voltage.

4. The device as recited in claim 1 wherein said third circuit includes a DC-to-DC down converter providing a selectable output DC voltage.

5. The device as recited in claim 1 said first circuit output voltage and said second circuit fixed DC output voltaae are generally the same value and are provided to a common node feeding said third circuit.

6. The device as recited in claim 4 wherein said selectable output DC voltage can be set to be higher than said input DC voltage.

7. The device as recited in claim 1 wherein said third circuit is adapted to couple to a plurality of removable programming keys, said keys providing different associated DC output voltages.

8. The device as recited in claim 7 wherein said key is a resistor, said predetermined DC output voltage being a function of said resistor value.

9. The device as recited in claim 7 wherein said key establishes an output current limiting function.

10. The device as recited in claim 7 wherein said key establishes an over voltage protection function.

11. The device as recited in claim 7 wherein said key establishes a output voltage function.

12. The device as recited in claim 7 wherein said key establishes a wrong-tip function.

13. The device as recited in claim 1 wherein said third circuit includes a thermal-protection function.

14. The device as recited in claim 1 wherein said DC output voltage provided by said third circuit is between 3VDC and 24VDC.

15. The device as recited in claim 4 wherein said up-converter and said down-converter are coupled in a master/slave configuration.

16. The device as recited in claim 15 wherein said up-converter and said down-converter are configured in a standard boost/buck topoology.

17. The device as specified in claim 4 wherein the DC-to-DC up-converter and the DC-to-DC down-converter are both switching converters.

18. The device as specified in claim 15 wherein said up-converter and said down-converter operate at the same frequency.

19. The device as specified in claim 14 wherein said second circuit is adapted to accept said DC input voltage between 11VDC and 16VDC.

20. The device as specified in claim 8 wherein said resistor is housed in a plug-in module.

* * * * *

UNITED STATES PATENT AND TRADEMARK OFFICE
CERTIFICATE OF CORRECTION

PATENT NO. : 6,775,163 B2
DATED : August 10, 2004
INVENTOR(S) : Gilbert MacDonald et al.

It is certified that error appears in the above-identified patent and that said Letters Patent is hereby corrected as shown below:

Column 6,
Line 55, "voltaae" should read -- voltage --

Column 8,
Line 3, "topoology" should read -- topology --

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,775,163 B2 |
| APPLICATION NO. | : 10/661216 |
| DATED | : August 10, 2004 |
| INVENTOR(S) | : Gilbert McDonald et al. |

It is certified that error appears in the above-identified patent and that said Letters Patent is hereby corrected as shown below:

Title Page
Item [75], Inventors, should read --Scott Smith-- NOT "Steve Smith".

Signed and Sealed this

Twenty-first Day of August, 2007

JON W. DUDAS
*Director of the United States Patent and Trademark Office*